(12) United States Patent
Soundararajan et al.

(10) Patent No.: US 9,244,147 B1
(45) Date of Patent: Jan. 26, 2016

(54) AUTOMATED PACKAGE DELIVERY TO A DELIVERY RECEPTACLE

(71) Applicant: GOOGLE INC., Mountain View, CA (US)

(72) Inventors: Varun Soundararajan, Sunnyvale, CA (US); Anurag Agrawal, Palo Alto, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/520,987

(22) Filed: Oct. 22, 2014

(51) Int. Cl.
- *G01S 1/44* (2006.01)
- *G05D 1/02* (2006.01)
- *G06Q 10/08* (2012.01)
- *G01C 21/00* (2006.01)

(52) U.S. Cl.
CPC . *G01S 1/44* (2013.01); *G01C 21/00* (2013.01); *G05D 1/0202* (2013.01); *G06Q 10/0833* (2013.01)

(58) Field of Classification Search
USPC ............................................................. 701/2
See application file for complete search history.

(56) References Cited

U.S. PATENT DOCUMENTS

| | | | |
|---|---|---|---|
| 6,266,142 B1 * | 7/2001 | Junkins et al. | 356/623 |
| 7,327,258 B2 * | 2/2008 | Fast et al. | 340/572.1 |
| 2002/0065600 A1 * | 5/2002 | Oka et al. | 701/200 |
| 2002/0156645 A1 | 10/2002 | Hansen | |
| 2003/0196358 A1 * | 10/2003 | Fratzke | 40/597 |
| 2008/0262718 A1 * | 10/2008 | Farwell | 701/207 |
| 2013/0332008 A1 * | 12/2013 | Herman et al. | 701/2 |
| 2014/0022055 A1 | 1/2014 | Levien et al. | |
| 2014/0032034 A1 | 1/2014 | Raptopoulos et al. | |
| 2014/0149244 A1 | 5/2014 | Abhyanker | |
| 2014/0204360 A1 | 7/2014 | Dowski et al. | |
| 2014/0254896 A1 | 9/2014 | Zhou et al. | |

OTHER PUBLICATIONS

Berthon, "International Search Report and Written Opinion issued in copending PCT Application No. PCT/US2015/028817 filed May 1, 2015", Jul. 14, 2015, 1-10.

Berthon, "International Search Report and Written Opinion issued in copending PCT Application No. PCT/US2015/028823 filed May 1, 2015", Jul. 14, 2015, 1-10.

(Continued)

*Primary Examiner* — Thomas Tarcza
*Assistant Examiner* — Alex C Dunn
(74) *Attorney, Agent, or Firm* — Johnson, Marcou & Isaacs, LLC

(57) ABSTRACT

Improving automated package delivery to mobile delivery receptacles to allow accurate and reliable package deliveries comprises a delivery receptacle for an automated package delivery via an unmanned aerial delivery device. The delivery receptacle is notified of a pending delivery and travels to a receiving location. The delivery receptacle emits infrared ("IR") beacons from one or more IR beacon transmitters. An aerial delivery device detects the IR beacon and uses the beacons to navigate to the delivery receptacle. The delivery receptacle receives IR beacon responses from the aerial delivery device and continually or periodically directs the IR beacons in the direction of the aerial delivery device. The aerial delivery device deposits the package in the delivery receptacle. After receiving the package, the delivery receptacle transports the package to a secure location, such as into a garage.

17 Claims, 8 Drawing Sheets

(56) References Cited

OTHER PUBLICATIONS

Haque, et al., "Autonomous Quadcopter for product home delivery", Electrical Engineering and Information & Communication Technology (ICEEICT), 2014 International Conference on, vol., no., doi: 10.1109/ICEEICT.2014.6919154, Apr. 12, 2014, 1,5, 10-12.

Marshall, "Office Action issued in copending U.S. Appl. No. 14/268,683, filed May 2, 2014", Apr. 20, 2015, 1-14.

* cited by examiner

US 9,244,147 B1

AUTOMATED PACKAGE DELIVERY TO A DELIVERY RECEPTACLE

TECHNICAL FIELD

The present disclosure relates to improving automated package delivery to a mobile delivery receptacle to allow more accurate and reliable deliveries.

BACKGROUND

Delivery services (also known as courier services, mail services, and shipping services), such as those offered by the U.S. Postal Service and commercial carriers, provide delivery of letters, packages, and parcels (hereinafter referred to as "packages") to and from residences and businesses across the country. Other delivery services may be provided by merchants, retailers, manufacturers, or other organizations that desire to deliver products to users. Typically, such services operate in a hub and spoke architecture.

A typical nationwide or international delivery service maintains a large fleet of vehicles. Such vehicles include airplanes and semi-trailer trucks to move packages between hubs and spokes, and smaller vehicles for the "last mile" from spoke endpoints to delivery destinations (for example, a home or business). In-between, the two largest commercial delivery services in the United States operate over 100,000 last mile vehicles, each of which requires a human operator. In certain situations, some interaction with a person at pickup or delivery is desired, for example, for proof of delivery, for payment on delivery (also known as "cash on delivery" or "COD"), or payment of delivery costs on pickup. The growth of business-to-consumer e-commerce, for example, online shopping, is expected to continue to increase the demand for delivery services and hence the need for capacity and efficiency in the last mile.

Unmanned, aerial delivery devices may be problematic for delivery to users. For example, an aerial delivery device that is powered by a rotor or an impeller may be dangerous to pets, overhead power lines, ceiling fans, or other features or residents at a delivery location. Furthermore, the aerial delivery device may not recognize a safe place to deliver a package. For example, leaving the package on the front porch of a busy street address may make it more likely that the package is stolen. Detailed delivery instructions to an unmanned aerial delivery device may be difficult for the limited vision system of the aerial delivery device to interpret. Thus, conventional aerial delivery device methods do not allow for safe, secure delivery of packages to delivery locations.

SUMMARY

In certain example aspects described herein, a computer-implemented method for improving automated package delivery to a mobile delivery receptacle to allow more accurate and reliable package deliveries is provided. In an example embodiment, the method provides receiving from a package delivery system processor, by one or more computing devices, delivery information associated with a package. The delivery device transports the package to the delivery address and locates one or more first beacons being transmitted by a delivery receptacle at the delivery address. The delivery device navigates to the delivery receptacle based on the triangulated position and transmits a second beacon to the delivery receptacle. The second beacon allows the delivery receptacle to adjust a direction of the one or more first beacons. The delivery device deposits the package into the delivery receptacle. The delivery device transports the package to a secure location.

In certain other example aspects described herein, a system and a computer program product for automated package delivery are provided.

These and other aspects, objects, features, and advantages of the example embodiments will become apparent to those having ordinary skill in the art upon consideration of the following detailed description of illustrated example embodiments.

DETAILED DESCRIPTION OF EXAMPLE EMBODIMENTS

Overview

Figure 1:
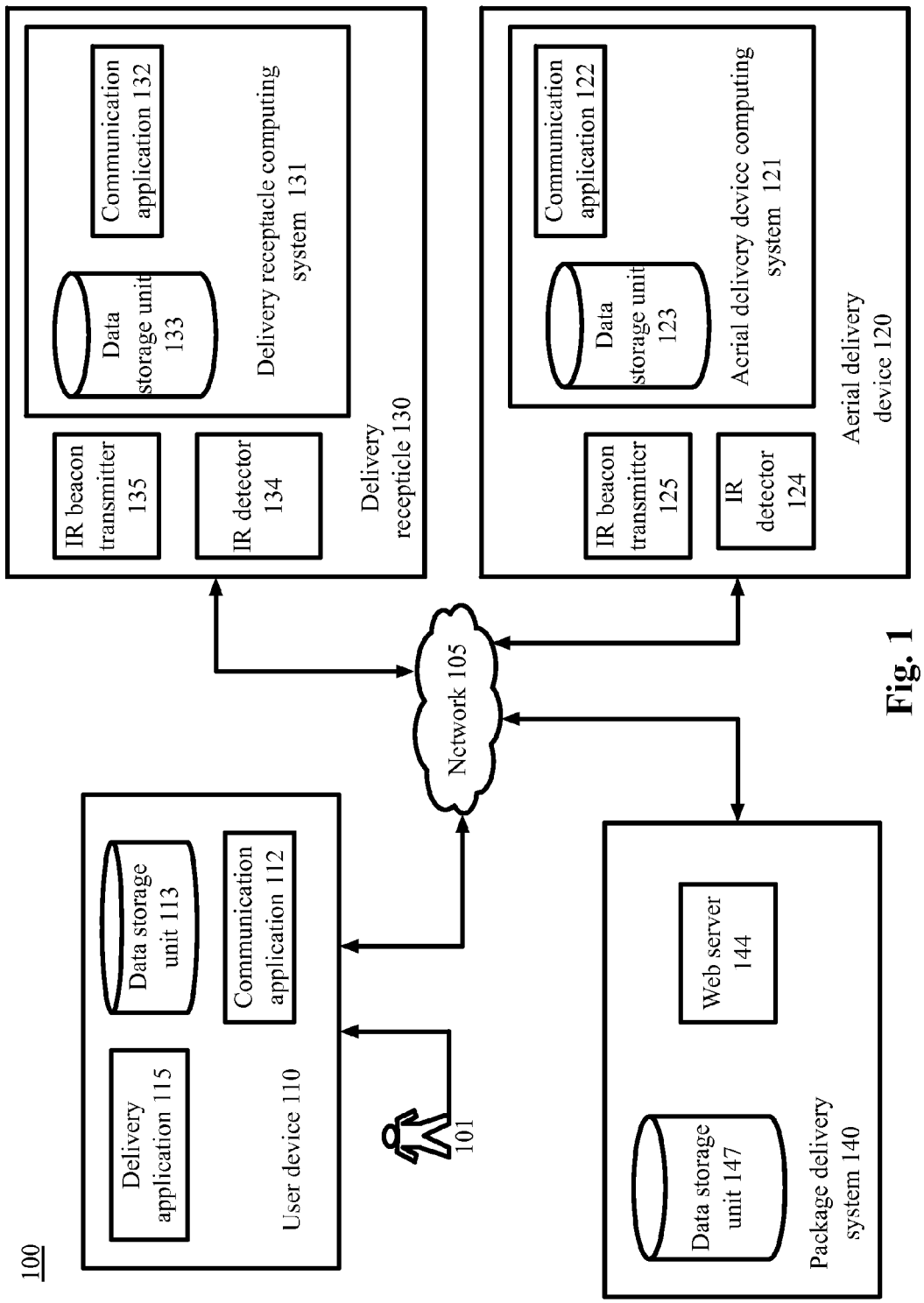
FIG. 1 is a block diagram depicting a system for an aerial delivery device to deliver a package, in accordance with certain example embodiments.

The example embodiments described herein provide computer-implemented techniques for providing a delivery receptacle for an automated package delivery via an unmanned aerial delivery device. In an example embodiment, a delivery receptacle emits infrared ("IR") beacons from one or more IR beacon transmitters. An aerial delivery device, such as a drone, detects the IR beacons and uses the beacons to navigate to the delivery receptacle. The delivery receptacle receives responses from the aerial delivery device and directs the IR beacons in the direction of the aerial delivery device. After receiving the package, the delivery receptacle transports the package to a secure location.

In an example embodiment, a package delivery system identifies a package for delivery to a user. The package delivery system may be a warehouse depot for a merchant system or manufacturer. The package delivery system may be a courier service, a package delivery agent, or any suitable delivery system. The package delivery system identifies a destination for the package, such as the residence of the user to whom the package is addressed. The package is associated with an aerial delivery device for delivery.

The user is provided with a time of delivery and an expected direction of approach of the aerial delivery device. The data is transmitted to the delivery receptacle computing system by a user computing device, the package delivery system, or another system or device. The delivery receptacle may use a robotic transportation system guided by the delivery receptacle computing system or other mechanism of relocating to a reception location. The package delivery system provides the delivery location to the aerial delivery device. For example, the package delivery system provides an address for a user residence. In another example, the package delivery system provides a GPS location to the aerial delivery device.

The delivery receptacle determines the direction from which the aerial delivery device will arrive and directs one or more IR beacons in the determined direction. Upon arrival at the user address, the aerial delivery device uses a detection technology to locate the IR beacons. For example, the aerial delivery device may hover over the specified address until the IR beacons are received. The aerial delivery device then triangulates the IR beacon sources and approaches the location. The aerial delivery device transmits an IR signal that is received by the delivery receptacle. The delivery receptacle may adjust the direction of the IR beacons transmissions to follow the movements of the aerial delivery device.

The aerial delivery device deposits the package into the delivery receptacle and notes the delivery of the package. The delivery receptacle recognizes the delivery of the package and transmits the package to a secure location, such as a base that secures the package. The delivery receptacle may notify the user computing device or others that the delivery is complete and secured.

By using and relying on the methods and systems described herein, the delivery receptacle and the aerial delivery device dynamically provide accurate and reliable automated package delivery. As such, the systems and methods described herein may be employed to prevent deliveries from automated systems from being delivered to incorrect locations, from being stored in an insecure location, from requiring user assistance, from missing the entrance to the delivery receptacle, from wasting computing processing time attempting to triangulate immobile beacons, and from other potential problems. Hence, the methods and systems described herein decrease user frustration and permit automated delivery devices to more effectively, efficiently, safely, accurately, and reliably deliver packages to users.

Example System Architecture

Turning now to the drawings, in which like numerals indicate like (but not necessarily identical) elements throughout the figures, example embodiments are described in detail.

FIG. 1 is a block diagram depicting a system 100 for an aerial delivery device 120 to deliver a package, in accordance with certain example embodiments. As depicted in FIG. 1, the system 100 includes network computing devices 110, 120, 130, and 140 that are configured to communicate with one another via one or more networks 105. In some embodiments, a user associated with a device must install an application and/or make a feature selection to obtain the benefits of the techniques described herein.

The network 105 can include a local area network ("LAN"), a wide area network ("WAN"), an intranet, an Internet, storage area network ("SAN"), personal area network ("PAN"), a metropolitan area network ("MAN"), a wireless local area network ("WLAN"), a virtual private network ("VPN"), a cellular or other mobile communication network, Bluetooth, NFC, or any combination thereof or any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network computing device 110, 120, 130, and 140 includes a device having a communication module capable of transmitting and receiving data over the network 105. For example, each network computing device 110, 120, 130, and 140 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network computing devices 110, 120, 130, and 140 may be operated or configured by users 101, aerial delivery device operators, users 101, and package delivery system operators, respectively.

An example user computing device 110 comprises a data storage unit 113, a delivery application 115, and a communication application 112. In an example embodiment, a user interface enables the user 101 to interact with the delivery application 115 and/or the communication application 112. For example, the user interface may be a touch screen, a voice-based interface or any other interface that allows the user 101 to provide input and receive output from an application or module on the user computing device 110.

In an example embodiment, the data storage unit 113 comprises a local or remote data storage structure accessible to the user computing device 110 suitable for storing information. In an example embodiment, the data storage unit 113 stores encrypted information, such as HTML5 local storage.

In an example embodiment, the user 101 can use a communication application 112, such as a web browser application or a delivery application 115, to view, download, upload, or otherwise access documents or web pages via a distributed network 105.

In an example embodiment, the delivery application 115 is a program, function, routine, applet, or similar entity that exists on and performs operations on the user computing device 110. In certain embodiments, the user 101 must install the delivery application 115 and/or make a feature selection on the user computing device 110 to obtain the benefits of the techniques described herein. In an example embodiment, the user 101 may access the delivery application 115 on the user computing device 110 via a user interface. In an example embodiment, a user 101 signs in to the delivery application 115, which enables the user 101 to interact with the delivery receptacle 130, the package delivery system 140, a merchant system, or other system to arrange, alter, or cancel the delivery of a product. The delivery application 115 may be used to exchange data with the delivery receptacle 130. For example, the delivery application may provide instructions to the delivery receptacle 130 for receiving a product from the aerial delivery device 120.

An example package delivery system 140 comprises a web server 144 and a data storage unit 147. In an example embodiment, the package delivery system 140 communicates with the user device 110, merchant systems, other package delivery systems, or any other person, group, or system that delivers or receives packages. In an example embodiment, user device 110 has a delivery application 115 distributed by the package delivery system 140 that enables the user 101 to access an account or information about a package. In another example embodiment, the user 101 accesses an account via the communication application 112 of the user device 110. In an example embodiment, when the user 101 accesses his account via the delivery application 115 or communication application 112, the web server 144 logs user device 110 location data.

The package delivery system 140 may represent any system that delivers or receives packages. For example, the package delivery system 140 may be a courier, a merchant system, a retailer, a shipping company, a postal service, or any suitable system.

The aerial delivery device 120 may be a drone or other unmanned vehicle. The aerial delivery device 120 may be helicopter, quadcopter, or other aerial delivery device. In alternative embodiments, a device other than an aerial delivery device can be utilized, which does not deliver packages via flight. For example, a wheeled vehicle or other vehicle that delivers packages without flight may be used.

In an example, the non-flying delivery device may utilize wheels, articulated legs, or any suitable means for propulsion. The non-flying delivery device may drive to a location, recognize the IR beacon, and proceed to the delivery receptacle 130 by rolling, walking, or via any suitable propulsion. The non-flying delivery device may deposit the package via an articulated arm, a conveyor belt, or any other suitable mechanisms.

The aerial delivery device 120 employs an aerial delivery device computing system 121. The aerial delivery device 120 computing system 121 comprises the hardware, software, and other devices for communication, navigation, image capturing, image processing, and any other suitable computerized or automated functions.

The aerial delivery device computing system 121 comprises a communication application 122 and a data storage unit 123. The aerial delivery device computing system 121 may utilize a communication application 122 to receive instructions for package deliveries. For example, the aerial delivery device computing system 121 may receive, via the communication application 122, delivery addresses, GPS locations, package details, or other delivery information. The aerial delivery device computing system 121 may utilize the data storage unit 123 for storing the information received via the communication application, and other suitable data.

The aerial delivery device 120 comprises an IR detector 124. The IR detector 124 of the aerial delivery device 120 may be any detector that captures infrared beacons or any other beacon. For example, the IR detector 124 may alternatively detect laser guidance beacons, BLUETOOTH signals, Wi-Fi, or any other suitable beacon, communication, signal, or transmission. The aerial delivery device computing system 121 analyzes received IR beacons or other signals to identify a location of the delivery receptacle 130. The aerial delivery device computing system 121 determines a location of the delivery receptacle 130 based on the analysis and navigates to the delivery receptacle 130.

The aerial delivery device 120 comprises an IR beacon transmitter 125. The IR beacon transmitter 125 may represent any beacon, signal or other transmission that is broadcast to the delivery receptacle 130. The IR beacon transmitter 125 may broadcast the IR signal or other signal to the delivery receptacle 130 to allow the delivery receptacle 130 to more accurately direct the IR beacon transmitter 135. In example embodiments, the IR beacon transmitter 125 may alternatively be a laser guidance beacon, BLUETOOTH signal, Wi-Fi signal, or any other suitable beacon, communication, signal, or transmission. Some functions described as being performed by one of the IR beacon transmitter 125, the IR detector 124, or the communication application 122 may alternatively be performed by one or more of the others applications or modules.

The aerial delivery device computing system 121 may also comprise a navigation system, such as a global positioning system ("GPS") or other navigation system. For example, the aerial delivery device computing system 121 may have a mapping system stored in the data storage unit 123 that works alone or in conjunction with onboard GPS technology to assist the aerial delivery device computing system 121 with navigation.

The delivery receptacle 130 may be a box or other container or vessel that is capable of receiving a package. The delivery receptacle 130 may be in the shape of a cube, a cylinder, or any other suitable shape. The delivery receptacle 130 may be equipped with a hatch, bay, door, or other opening that allows a package to be placed inside. The door may be spring actuated, or actuated by any other mechanical or electrical means, to allow the door to return to a closed position after the package is delivered.

The delivery receptacle 130 may be equipped with a system to allow the delivery receptacle 130 to move to a package receiving area and back to a secure location. In an example, the delivery receptacle 130 may utilize wheels, rotors for flying, articulated legs, or any suitable means for propulsion or locomotion. The delivery receptacle 130 may proceed to a desired location by rolling, walking, flying, or via any suitable propulsion.

The delivery receptacle 130 employs a delivery receptacle computing system 131. The delivery receptacle computing system 131 comprises the hardware, software, and other devices for communications, navigations, IR transmitting and receiving, and any other suitable computerized or automated functions.

The delivery receptacle computing system 131 comprises a communication application 132 and a data storage unit 133. The delivery receptacle computing system 131 may utilize a communication application 132 to receive data related to package deliveries. For example, the delivery receptacle computing system 131 may receive, via the communication application 132, delivery times, arrival directions, package details, safe receiving areas, or other delivery information. The delivery receptacle computing system 131 may use the communication application 132 to communicate with the user computing device 110. For example, the delivery receptacle computing system 131 may communicate that a package has been delivered. The delivery receptacle computing system 131 may utilize the data storage unit 133 for storing the information received via the communication application, and other suitable data.

The delivery receptacle 130 may comprise an IR detector 134. The IR detector 134 may be any detector that captures infrared beacons or any other beacon. For example, the IR detector 134 may detect laser guidance beacons, BLUETOOTH signals, Wi-Fi, or any other suitable beacon, communication, signal, or transmission. The delivery receptacle computing system 131 analyzes IR beacons to identify a location of the aerial delivery device 130. The aerial delivery device computing system 121 determines a location of delivery receptacle 130 based on the analysis and navigates to the delivery receptacle 130.

The delivery receptacle 130 comprises an IR beacon transmitter 135. The IR beacon transmitter 135 may represent any beacon, signal or other transmission that is broadcast to the aerial delivery device 120. The IR beacon transmitter 135 may broadcast the IR signal or other signal to the aerial delivery device 120 to allow the aerial delivery device 120 to be guided into a position to deposit a package. In example embodiments, the IR beacon transmitter 135 may alternatively be a laser guidance beacon, BLUETOOTH signal, Wi-Fi signal, or any other suitable beacon, communication, signal, or transmission.

The delivery receptacle 130 may utilize a particular configuration of IR beacon transmitters 135 to allow the aerial delivery device 120 to triangulate a relative position. In an example, the IR beacon transmitters 135 are located on four corners of the top surface of the delivery receptacle 130. Additionally, the IR beacon transmitters 135 may be mounted to a movable device that can be used to change the direction of the transmission of the IR beacon transmitter 135. For example, the IR beacon transmitters 135 may be mechanically rotated to provide a 360 degree broadcast range. That is, when the direction of an aerial delivery device 120 is identified, the IR beacon transmitters 135 may be rotated to a position such that the IR beacon transmitter 135 is transmitting in a direction in which the aerial delivery device 120 is located. In an example, the movable device is a motorized mechanism that may be directed by the delivery receptacle computing system 131. In certain embodiments, the delivery receptacle computing system 131 utilizes a compass or other direction determining device to determine an aiming configuration.

Some functions described as being performed by one of the IR beacon transmitters 135, the IR detector 134, or the communication application 132 may alternatively be performed by one or more of the others applications or modules.

The delivery receptacle computing system 131 may also comprise a navigation system, such as a global positioning system ("GPS") or other navigation system. For example, the delivery receptacle computing system 131 may have a mapping system stored in the data storage unit 123 that works alone or in conjunction with onboard GPS technology to assist the delivery receptacle computing system 131 with navigation. The delivery receptacle 130 may use the navigation system to position the delivery receptacle 130 for receiving a package, for moving a package to a safe location, or for any suitable reason.

It will be appreciated that the network connections shown are example and other means of establishing a communications link between the computers and devices can be used. Additionally, those having ordinary skill in the art having the benefit of the present disclosure will appreciate that the user computing device 110, the aerial delivery device 120, the delivery receptacle 130, and the package delivery system 140 illustrated in FIG. 1 can have any of several other suitable computer system configurations. For example, a user computing device 110 embodied as a mobile phone or handheld computer, or an aerial delivery device, may or may not include all the components described above.

Figure 8:
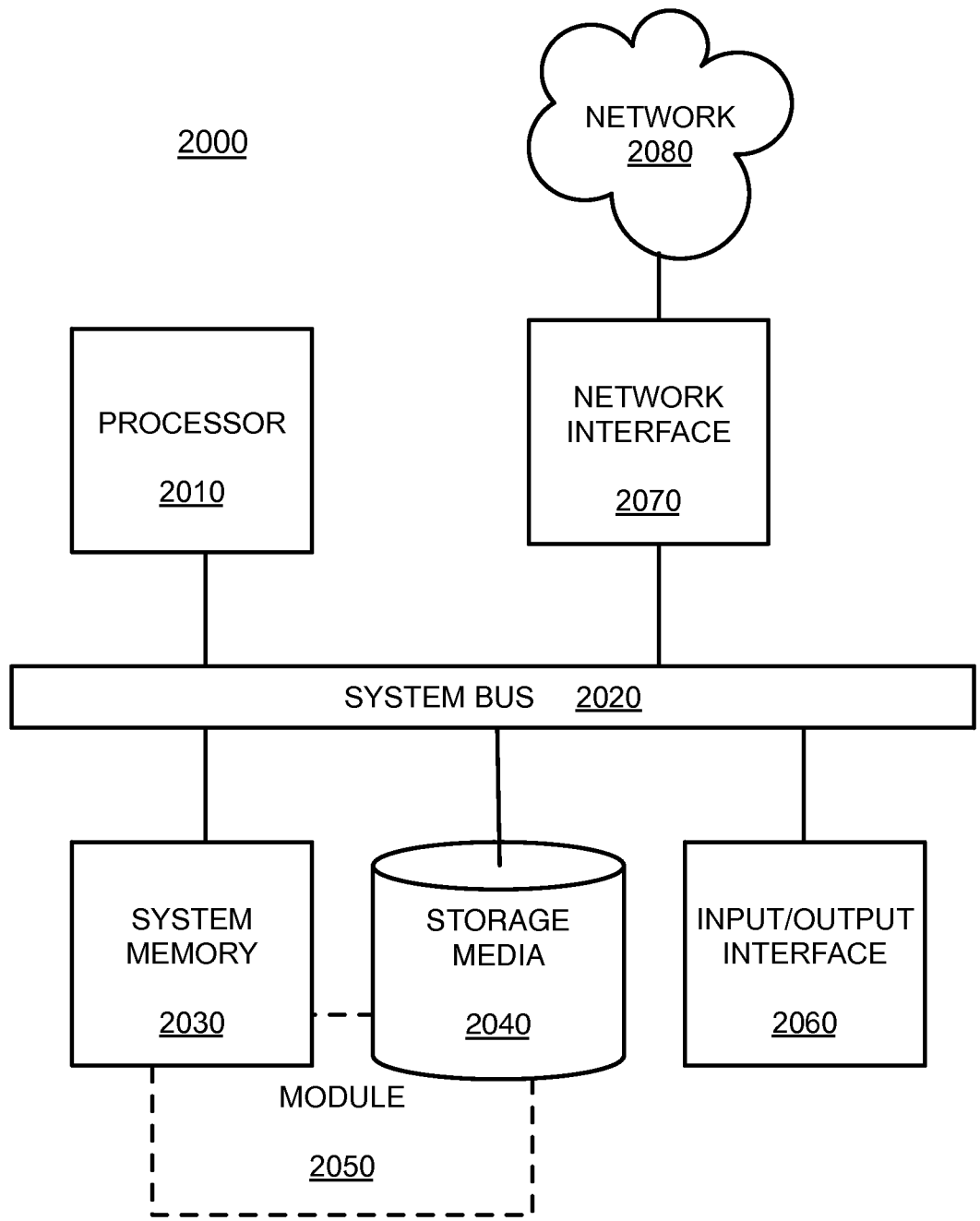
FIG. 8 is a block diagram depicting a computing machine and module, in accordance with certain example embodiments.

In example embodiments, the network computing devices and any other computing machines associated with the technology presented herein may be any type of computing machine such as, but not limited to, those discussed in more detail with respect to FIG. 8. Furthermore, any modules associated with any of these computing machines, such as modules described herein or any other modules (scripts, web content, software, firmware, or hardware) associated with the technology presented herein may by any of the modules discussed in more detail with respect to FIG. 8. The computing machines discussed herein may communicate with one another as well as other computer machines or communication systems over one or more networks, such as network 105. The network 105 may include any type of data or communications network, including any of the network technology discussed with respect to FIG. 8.

Example Processes

The example methods illustrated in FIGS. 2-6 are described hereinafter with respect to the components of the example operating environment 100. The example methods of FIGS. 2-6 may also be performed with other systems and in other environments.

Figure 2:
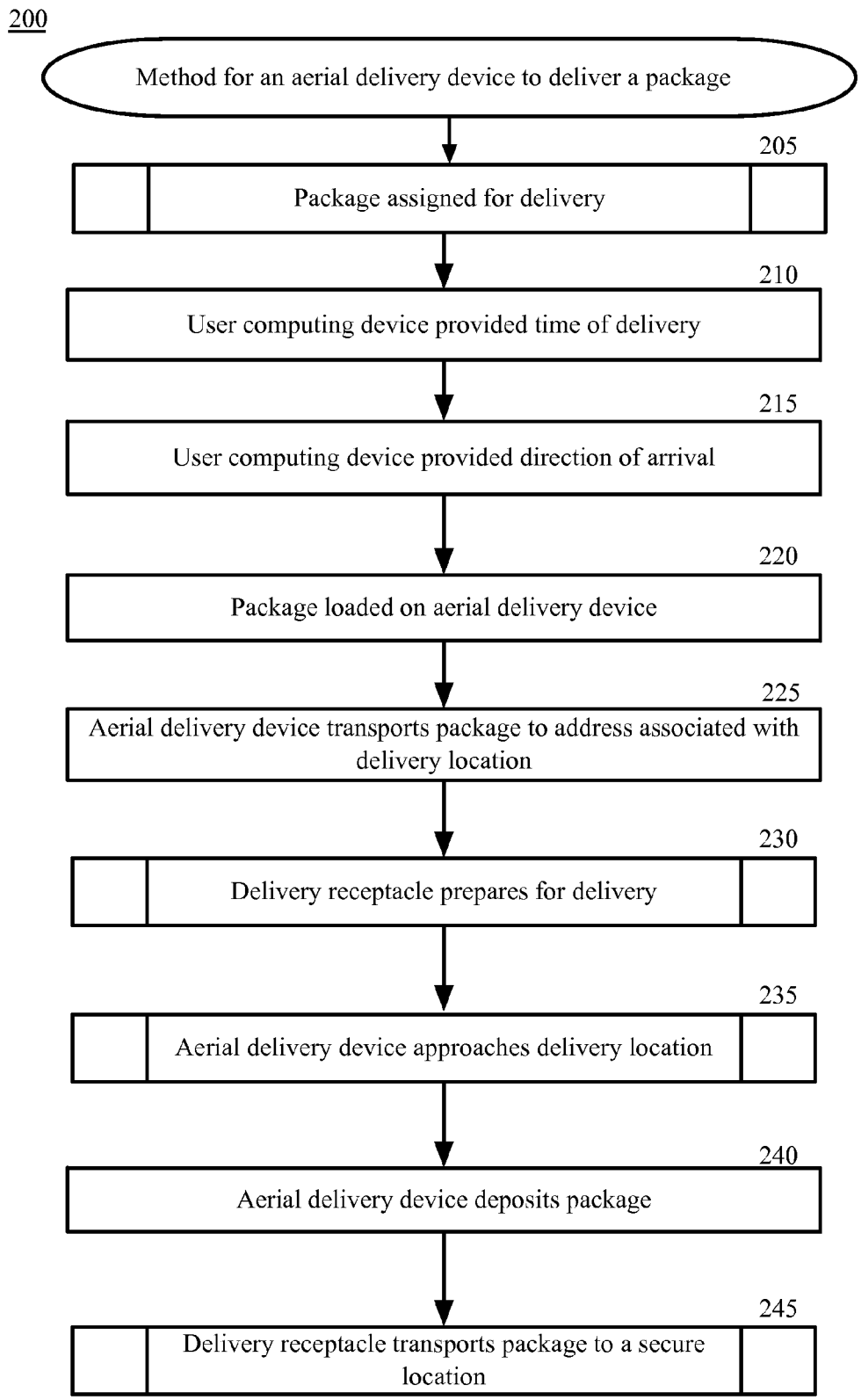
FIG. 2 is a block flow diagram depicting a method for an aerial delivery device to deliver a package, in accordance with certain example embodiments.

FIG. 2 is a block diagram depicting a method 200 for an aerial delivery device to deliver a package, in accordance with certain example embodiments. The method 200 is described with reference to the components illustrated in FIG. 1.

In block 205, a package is assigned for delivery. The package may be any product for delivery to user 101, a merchant, or other recipient. The details of block 205 are described in greater detail in FIG. 3.

Figure 3:
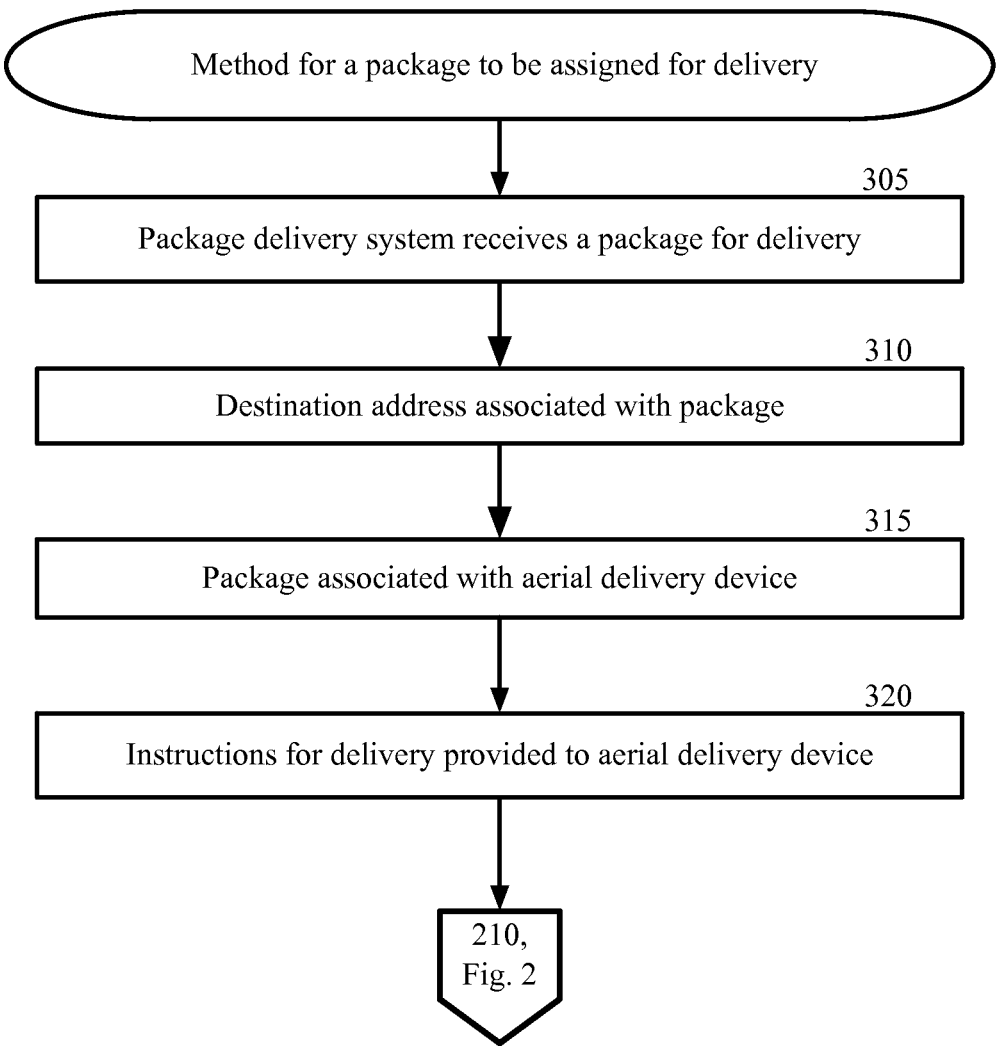
FIG. 3 is a block flow diagram depicting a method for a package to be assigned for delivery, in accordance with certain example embodiments.

FIG. 3 is a block diagram depicting a method 205 for a package to be assigned for delivery, in accordance with certain example embodiments. The method 205 is described with reference to the components illustrated in FIG. 1.

In block 305, a package delivery system 140 receives a package for delivery. The package delivery system 140 may be any system, company, organization, government service, or individual that delivers packages from one location to another. For example, the package delivery system 140 may be a courier, postal service, package delivery company, a merchant system, a retailer, or any other suitable system that delivers packages. The package for delivery arrives at the package delivery system 140 with appropriate paperwork for delivery to a user 101. The paperwork may be digital, a barcode or other machine-readable code, a sticker, or any suitable paperwork. The paperwork may contain a user 101 name, a user address, a confirmation number, a sender name and address, and other identifying information for the recipient, sender, origin location, and/or delivery location 104.

The delivery information may be provided by the sender of the package or by the user 101. For example, the sender or the user 101 may enter the delivery information into a website of the package delivery system 140. In another example, the sender or the user 101 may enter the delivery information into a delivery application 115 or in any suitable manner input delivery instructions that are communicated to the package delivery system 140.

In block 310, a destination address is associated with the package. For example, the package delivery system 140 obtains the delivery address from the paperwork or digital information associated with the package. The delivery address is stored with identification of the package in the package delivery system 140.

In block 315, the package delivery system 140 associates the package with an aerial delivery device computing system 121. The package delivery system 140 may identify an aerial delivery device 120 that is associated with a delivery area in which the delivery address is located. For example, certain aerial delivery devices 120 may be assigned a delivery route that encompasses a particular geographic region. If the delivery address is located in that geographic region, then the package may be associated with that particular aerial delivery device 120. In an alternate embodiment, the package is associated with the aerial delivery device 120 that is next in a queue of aerial delivery devices 120.

In block 320, the instructions for delivery of the package are provided to the aerial delivery device computing system 121. In an example embodiment, the instructions are delivered to the communication application 122 of the aerial delivery device computing system 121 via near field communication, Bluetooth, Wi-Fi, or any available communication. The instructions may be transmitted to the aerial delivery device computing system 121 by a computing system associated with the package delivery system 140. For example, an operator of the package delivery system 140 may direct a computing system to deliver the instructions, or the operator may enter the instructions directly into a user interface of the aerial delivery device computing system 121. Any suitable manner of transmitting the instructions to the aerial delivery device computing system 121 may be used.

For example, the package delivery system 140 provides to the aerial delivery device computing system 121 an address for a user residence. In another example, the package delivery system provides a GPS location to the aerial delivery device. Additionally, the aerial delivery device computing system 121 is provided with the infrared ("IR") beacon or other signaling technology that is associated with the delivery receptacle 130 to which the package should be delivered. Any suitable instructions that will allow the aerial delivery device to locate the delivery location 104 may be used.

From block 320, the method 305 returns to block 210 of FIG. 2.

Returning to FIG. 2, in block 210, the user 101 is provided a time to expect the delivery. The delivery time may be transmitted to the user computing device 110 by the package delivery system 140, a merchant system, or other entity. The user computing device 110 may store the expected delivery time or communicate the expected delivery time to the delivery receptacle 130 or another computing device. The user computing device 110 may display the expected delivery time to the user 101 via the user interface of the user computing device 110. Alternatively, the time to expect the delivery is provided directly to the delivery receptacle computing system 131. For example, the delivery time may be transmitted to the delivery receptacle computing system 131 via cellular or other wireless technology.

In block 215, the user 101 is provided direction of arrival of the aerial delivery device 120 when delivering the package. The delivery time may be transmitted to the user computing device 110 by the package delivery system 140, a merchant system, or other entity. The user computing device 110 may store the expected arrival direction or communicate the expected arrival direction to the delivery receptacle 130 or another computing device. The user computing device 110 may display the expected arrival direction to the user 101 via the user interface of the user computing device 110. Alternatively, the direction of arrival is provided directly to the delivery receptacle computing system 131. For example, the direction of arrival may be transmitted to the delivery receptacle computing system 131 via cellular or other wireless technology.

In block 220, the package is loaded onto the aerial delivery device 120. The package may be loaded in in any suitable manner that allows the aerial delivery device 120 to transport the package to the delivery location. For example, the aerial delivery device 120 may be equipped with a platform for supporting the package during transit. In another example, the aerial delivery device 120 may support the package with a strap, a hook, an attached net, a winch, or with any suitable attachment device. The package maybe loaded with an automated packaging process. Alternatively, the package maybe loaded manually by an operator at the package delivery system 140. The aerial delivery device computing system 121 may receive a digital confirmation of the package's identification from an operator or a computing system of the package delivery system 140.

In block 225, the aerial delivery device 120 transports the package to the address associated with the delivery destination. The aerial delivery device 120 may proceed to the address associated with the user 101. For example the aerial delivery device 120 may fly to the address via a predetermined route. In an example embodiment, the aerial delivery device computing system 121 may navigate via a mapping program to proceed to the address by following a route provided by the mapping program to reach the destination address of the user 101. In an alternative example embodiment, the aerial delivery device computing system 121 may navigate via a global positioning system ("GPS") technology to the destination address of the user 101. The aerial delivery device 120 may be transported a portion of the distance to the delivery address by a separate vehicle. For example, a delivery truck may deliver multiple aerial delivery devices 120 to within a location that is central to multiple delivery addresses. The aerial delivery device 120 then leaves the delivery truck and travels the remaining distance with the package.

In an example embodiment, the aerial delivery device 120 arrives at the address of the delivery location when the aerial delivery device 120 is on or above the street directly in front of the structure at the address. In another example, the aerial delivery device 120 hovers over the property located at the address. In an example, the aerial delivery device computing system 120 may confirm the arrival at the delivery address by comparing the appearance of the delivery address with a digital image of the digital address provided by the package delivery system 140 or other suitable provider.

In block 230, the delivery receptacle 130 prepares for the delivery. Block 230 is described in greater detail with reference to FIG. 4.

Figure 4:
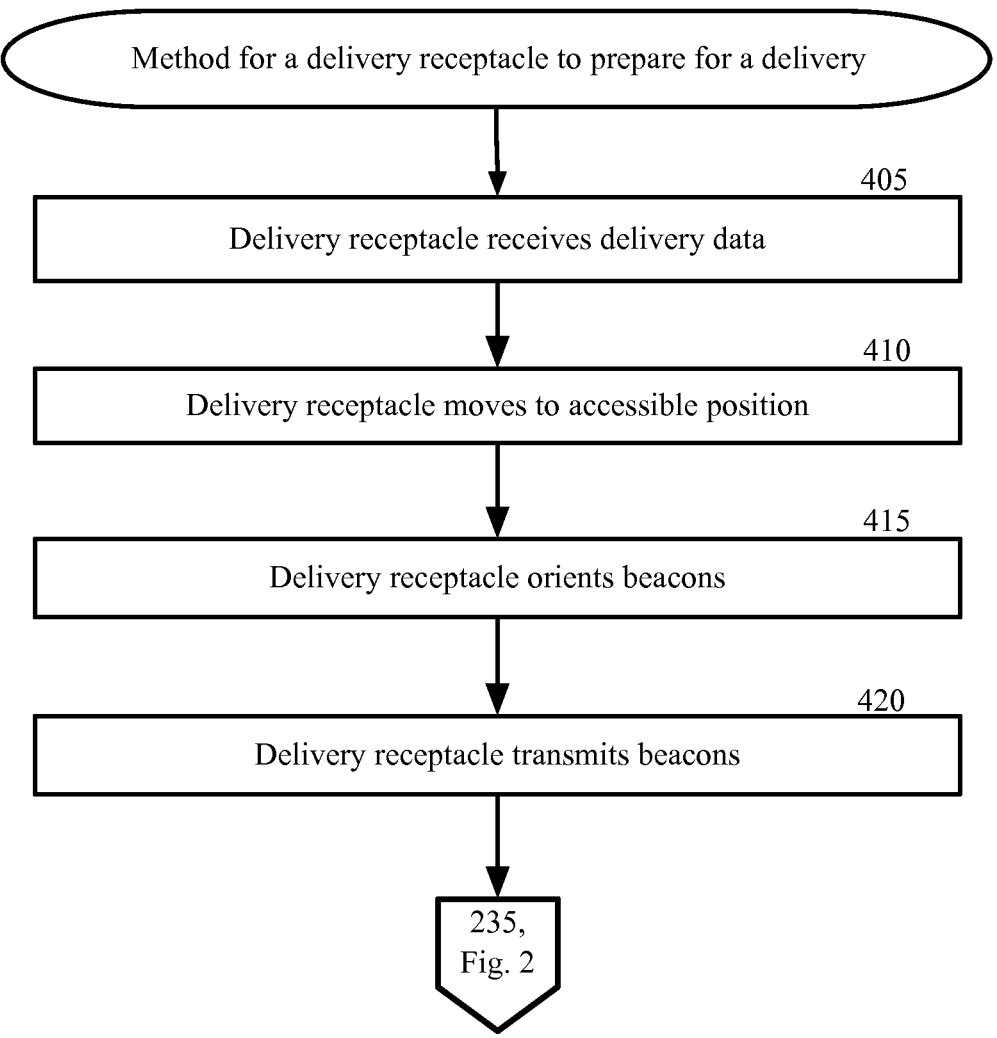
FIG. 4 is a block flow diagram depicting a method for a delivery receptacle to prepare for a delivery, in accordance with certain example embodiments.

FIG. 4 is a block flow diagram depicting a method 230 for a delivery receptacle to prepare for a delivery, in accordance with certain example embodiments. The method 230 is described with reference to the components illustrated in FIG. 1.

In block 405, the delivery receptacle 130 receives the delivery data. The delivery receptacle 130 may receive the delivery data from the user computing device 110, the package delivery system 140, a merchant system, or any suitable device or system. The delivery data may include the delivery time, direction of arrival of a aerial delivery device 120, the expected size and shape of the package, shipper identification, package delivery system 140 identification, data related to the product being delivered, or any suitable data. The data transmission may be received by the communication application 132 of the delivery receptacle 130.

In block 410, the delivery receptacle 130 moves to an accessible position to receive the delivery. In an example, the delivery receptacle 130 determines, based on the delivery data, that the package will fit inside the delivery receptacle 130 or can otherwise be accommodated. The delivery receptacle determines, based on the direction of arrival of the aerial delivery device 120 and other delivery data, an appropriate location to receive the package. For example, the location may be selected to allow a safe, secure deposit of the package. For example, if the user 101 has a pet that may be injured by rotating blades on the aerial delivery device, then a location that is raised above the ground may prevent the pet from reaching the aerial delivery device 120. In another example, the delivery receptacle 130 may select a location that is not directly under power lines or an antenna. In another example, the delivery receptacle 130 may select a location that will prevent the package from being in view of passersby. The selection by the delivery receptacle 130 may be based on a configuration by the user 101 or another party, by an analysis of the environs of the delivery location, or any other suitable criteria.

The delivery receptacle 130 may move to the delivery location by any suitable manner. For example, the delivery receptacle 130 may identify a preferred delivery location on a stored map of the property. The delivery receptacle 130 may have a layout of the property stored on the delivery receptacle computing system 131, or the delivery receptacle 130 may develop a layout by traversing some or all of the property. The preferred locations for deliveries may be stored on the layout.

The delivery receptacle 130 may move to the location by any of the described means of locomotion. For example the delivery receptacle 130 may initiate a power source that powers the delivery receptacle 130 to drive to the preferred location. In the example, the delivery receptacle 130 may be powered by an electric motor that drives the wheels to propel the delivery receptacle 130.

Figure 7:
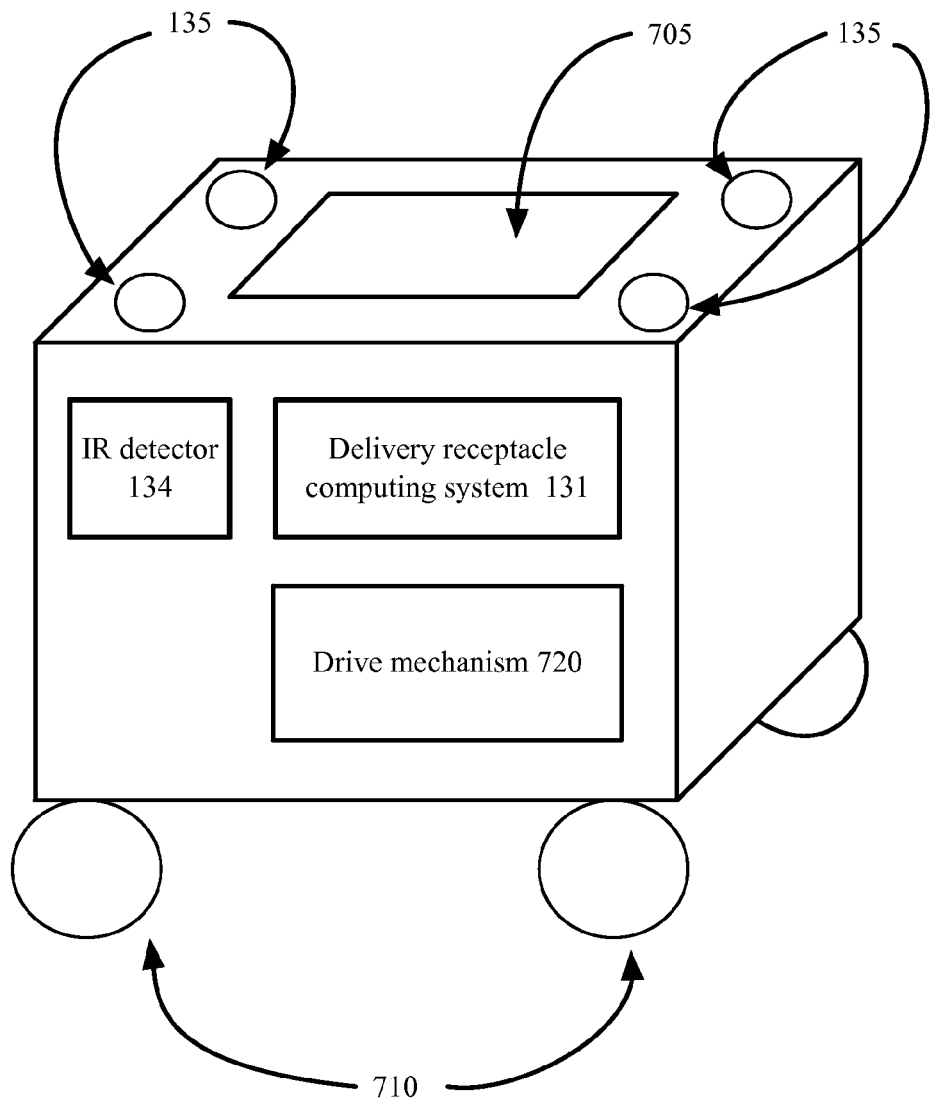
FIG. 7 is an illustration of a delivery receptacle, in accordance with certain example embodiments.

FIG. 7 is an illustration of a delivery receptacle 130, in accordance with certain example embodiments. The delivery receptacle 130 is illustrated as a cubic receptacle for receiving packages. On the top surface of the delivery receptacle 130 is a door 705 or other opening for receiving packages. The door 705 may open with pressure, with a mechanical or electrical motor, with a pneumatic actuation, or in any suitable manner. The door 705 will allow a package to be deposited into the delivery receptacle 130. The door 705 may close after the package has been deposited.

The delivery receptacle 130 is shown with four IR beacon transmitters 135 on the four corners of the top surface. The IR beacon transmitters 135 are described in greater detail with respect to FIG. 1. The delivery receptacle 130 is shown with wheels affixed to the bottom surface for transporting the delivery receptacle 130 and received packages. The wheels 710 may be powered the drive mechanism 720. The drive mechanism 720 may be an electrical or mechanical motor or other suitable power source that allows the delivery receptacle 130 to move freely from one location to another location. The wheels 710 may be constructed of metal, rubber, plastic, or any suitable material. The wheels 710 may be affixed to the delivery receptacle 130 in a typical manner, such as via an axel that is powered by an electrical motor. Any suitable wheeled construction may be used.

The delivery receptacle 130 is shown with a delivery receptacle computing system 131 and IR detector 134. The delivery receptacle computing system 131 and IR detector 134 are described in greater detail with respect to FIG. 1.

In block 415, the delivery receptacle 130 orients the IR beacons. After arriving at the preferred delivery location, the delivery receptacle 130 consults a device or system that orients the devices direction, such as a compass. The delivery receptacle 130 compares the direction from which the aerial delivery device 120 will arrive to the orientation of the delivery receptacle 130 based on the results provided by the compass. The delivery receptacle 130 determines the direction to orient the IR beacons such that the IR beacons are directed substantially at the arriving aerial delivery device 120.

IR beacons that are directed substantially at the aerial delivery device 120 will allow the aerial delivery device 120 to more accurately receive the IR beacons and triangulate a path to the delivery receptacle 130. The IR beacon transmitters 135 may represent any beacon, signal, or other transmission that is broadcast to the aerial delivery device 120. The IR beacon transmitter 135 may broadcast the IR signal or other signal to the aerial delivery device 120 to allow the aerial delivery device 120 to be guided into a position to deposit a package. In example embodiments, the IR beacon transmitter 135 may alternatively be a laser guidance beacon, BLUETOOTH signal, Wi-Fi signal, or any other suitable beacon, communication, signal, or transmission.

In block 420, the IR beacon transmitters 135 on the delivery receptacle 130 transmit the IR beacons. The IR beacon transmitters are directed by the delivery receptacle computing system 131 to begin transmitting the IR beacon. In an example, the IR beacon transmitters 135 are located on the four corners of the top surface of the delivery receptacle 130. The IR beacon transmitters 135 may be mounted to a movable device that can be used to change the direction of the transmission of the IR beacon transmitter 135. For example, the IR beacon transmitters 135 may be mechanically rotated to provide a 360 degree broadcast range. That is, when the direction of an aerial delivery device 120 is identified, the IR beacon transmitters 135 may be rotated to a position such that the IR beacon transmitter 135 is transmitting in a direction in which the aerial delivery device 120 is located. In an example, the movable device is a motorized mechanism that may be directed by the delivery receptacle computing system 131.

From block 420, the method 230 returns to block 235 of FIG. 2.

Returning to FIG. 2, in block 235, the aerial delivery device 120 approaches the delivery location. Block 235 is described in greater detail with reference to FIG. 5.

Figure 5:
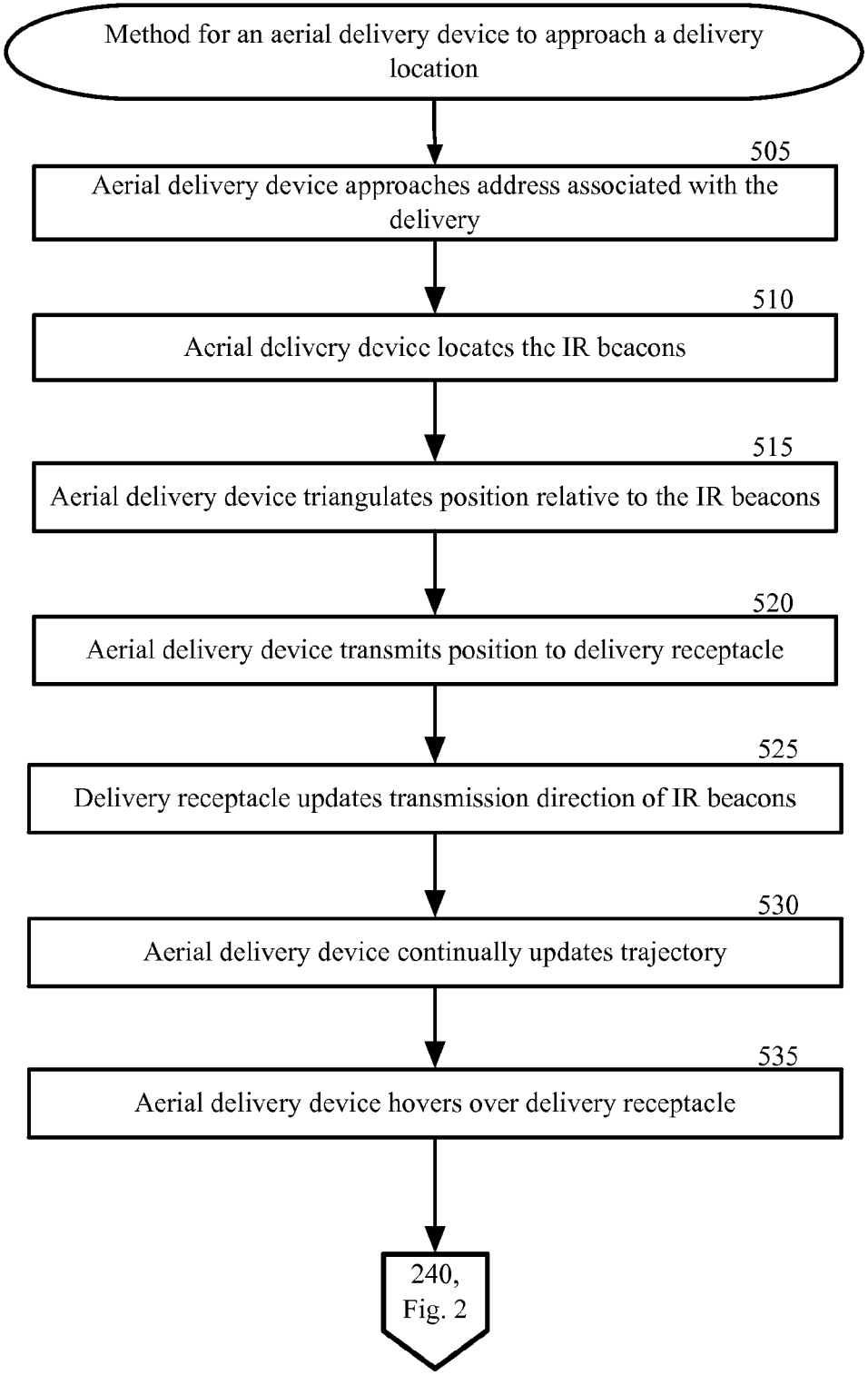
FIG. 5 is a block flow diagram depicting a method for an aerial delivery device to approach a delivery location, in accordance with certain example embodiments.

FIG. 5 is a block flow diagram depicting a method 235 for an aerial delivery device to approach a delivery location, in accordance with certain example embodiments. The method 235 is described with reference to the components illustrated in FIG. 1.

In block 505, the aerial delivery device 120 approaches the address associated with the delivery. In a certain embodiment, the aerial delivery device computing system 121 has not been provided with the positioning of the delivery receptacle 130 at the delivery address. For example, the aerial delivery device computing system 121 is only provided with information specifying that the delivery receptacle 130 is located on the property associated with the destination address. The aerial delivery device 120 may proceed to a position adjacent to or over the property at the delivery address to achieve an improved perspective. Alternatively, the aerial delivery device 120 may traverse the airspace over the property of the delivery address to allow the IR detector 124 to obtain a thorough coverage of the delivery address.

In certain embodiments, the aerial delivery device computing system 121 has been provided with information associated with the positioning of the delivery receptacle 130 at the delivery address. For example, if the package delivery system 140 provided information that the delivery receptacle 130 is located on the back patio, then the aerial delivery device 120 flies directly to an area from which the IR beacons may be detectable from the back patio. Other example delivery receptacle 130 locations might include on a front porch, on an upstairs balcony, behind a fence gate, on a loading dock, or in any suitable location. In an exemplary embodiment, the aerial delivery device 120 is provided with coordinates on the property from which the delivery receptacle 130 may be determined. If the aerial delivery device computing system 121 has been provided with the delivery receptacle 130 location or initial coordinates to determine the location, then the aerial delivery device 120 may proceed to that general location on the property of the user 101.

In block 510, the aerial delivery device computing system 121 locates the IR beacons. For example, the aerial delivery device computing system 121 utilizes an IR detector 124 or other detection devices to scan the delivery address in search of the IR beacons. The IR detector 124 recognizes one or more IR beacons being transmitted by the one or more IR beacon transmitters 135. The IR detector 124 recognizes the location of the one or more IR beacon transmitters 135 by triangulating the incoming IR beacons. For example, the aerial delivery device computing system 121 identifies one or more IR beacon sources and performs a triangulation algorithm based on the differences in the angle of the IR beacon, signal strength, distances from one IR beacon to another, or any other detectable feature of the one or more IR beacons. In an alternative embodiment, the aerial delivery device computing system 121 interprets any data provided in the IR beacon. For example, the IR beacon may contain data instructions to the aerial delivery device computing system 121 for delivery or other suitable data. Alternatively, as the IR beacon may be comprised of a beacon created by any suitable technology other than IR, the beacon may comprise any suitable data to allow the aerial delivery device computing system 121 to determine a delivery location.

In block 515, the aerial delivery device computing system 121 triangulates its position relative to the IR beacons. The aerial delivery device computing system 121 analyzes the one or more IR beacons and performs a triangulation algorithm that produces a location of the aerial delivery device 120 relative to the IR beacons. The aerial delivery device computing system 121 may utilize any suitable algorithm to locate the position of the delivery receptacle 130. The triangulation may be based on the determination of the location of a plurality of IR beacon transmitters 135. For example, the aerial delivery device computing system 121 may be provided data that specifies that the IR beacon transmitters 135 are located on the four top corners of a receptacle that is a cube with one meter sides. In the example, based on the known distance between the IR beacons and the angles at which the IR beacons are received, the aerial delivery device computing system 121 is able to determine the distance from the aerial delivery device 120 to the delivery receptacle 130 and the relative elevation difference.

In block 520, the aerial delivery device computing system 121 transmits the position of the aerial delivery device 120 to the delivery receptacle 130. The IR beacon transmitters 125 on the aerial delivery device 120 transmit IR beacons to be received by the IR detector 134 on the delivery receptacle 130. The IR beacon transmitters 125 may be directed by the aerial delivery device 120 to begin transmitting the IR beacon. The transmission from the aerial delivery device 120 may provide data or other information to the delivery receptacle 130. In another embodiment, the IR beacons may be used by the delivery receptacle 130 to locate the position of the aerial delivery device 120.

In an example, the IR beacon transmitter 125 is mounted to a movable device attached to the aerial delivery device 120 that can be used to change the direction of the transmission of the IR beacon transmitter 125. For example, the IR beacon transmitter 125 may be mechanically rotated to provide a 360 degree broadcast range. That is, when the direction of the delivery receptacle 130 is identified, the IR beacon transmitter 125 may be rotated to a position such that the IR beacon transmitter 125 is transmitting in a direction in which the delivery receptacle 130 is located. In an example, the movable device is a motorized mechanism that may be directed by the aerial delivery device computing system 121.

In block 525, the delivery receptacle 130 updates the transmission direction of the IR beacons transmitters 135. When the aerial delivery device 120 provides the IR beacon to the delivery receptacle 130, the delivery receptacle computing system 131 updates the position of the aerial delivery device 120 relative to the delivery receptacle 130. The delivery receptacle 130 adjusts the direction of the transmission of the IR beacon to the current location of the aerial delivery device 120. That is, if the aerial delivery device 120 has moved from the original direction of approach, then the IR beacon transmitters 135 are adjusted accordingly.

In block 530, the aerial delivery device 120 continually updates the trajectory. As the aerial delivery device 120 moves toward the location of the delivery receptacle 130, the aerial delivery device computing system 121 continually or periodically analyzes the location of the IR beacons transmitters 135 and adjusts the direction, the height, and the speed of the aerial delivery device 120. The aerial delivery device 120 may decrease the travel velocity as the delivery receptacle 130 is approached.

In block 535, the aerial delivery device 120 hovers over the delivery receptacle 130. The aerial delivery device 120 approaches the location of the delivery receptacle 130 by following the direction of the IR beacons. The aerial delivery device 120 hovers over an area for receiving the package. The area may be a chute, bay, door, or other location on the delivery receptacle 130 for receiving the package. The area may be specified based on instructions received by the aerial delivery device 120 from the delivery receptacle 130, the package delivery system 140, a merchant system, a user computing device 110, or other device. For example, the area may be specified as a location directly between two of the IR beacon transmitters 135.

In another example, the area for the delivery may be dictated by the configuration of the IR beacon transmitters 135. For example, the area may be the exact center of four IR beacon transmitters 135 on the corners of the delivery receptacle 130.

From block 535, the method 235 returns to block 240 of FIG. 2.

Returning to FIG. 2, in block 240, the aerial delivery device 120 deposits the package into the delivery receptacle 130. For example, the aerial delivery device 120 may lower the package via a retractable line or cable and then release the package onto the specified area of the delivery receptacle 130. In another example, the aerial delivery device 120 hovers over the delivery receptacle 130 and releases the package allowing the package to drop to the delivery platform, where the vertical drop distance is maintained below a predetermined threshold height to prevent damage to the package. The aerial delivery device 120 may deposit the package in any suitable manner.

After depositing the package, the aerial delivery device computing system 121 may obtain a visual image verification that the package has been delivered. For example, the aerial delivery device computing system 121 may capture a digital image of the package resting in the delivery receptacle with a camera module located on the aerial delivery device computing system 121. Any other manner of verifying the delivery may be utilized. The aerial delivery device computing system 121 stores a confirmation that the package has been delivered. Additionally or alternatively, the aerial delivery device computing system 121 transmits the delivery confirmation to the package delivery system 140 and/or to the user computing device 110.

The aerial delivery device 120 returns to the package delivery system location or proceeds to deliver a subsequent package.

In block 245, the delivery receptacle 130 transports the package to a secure location. Block 245 is described in greater detail with reference to the method 245 of FIG. 6.

Figure 6:
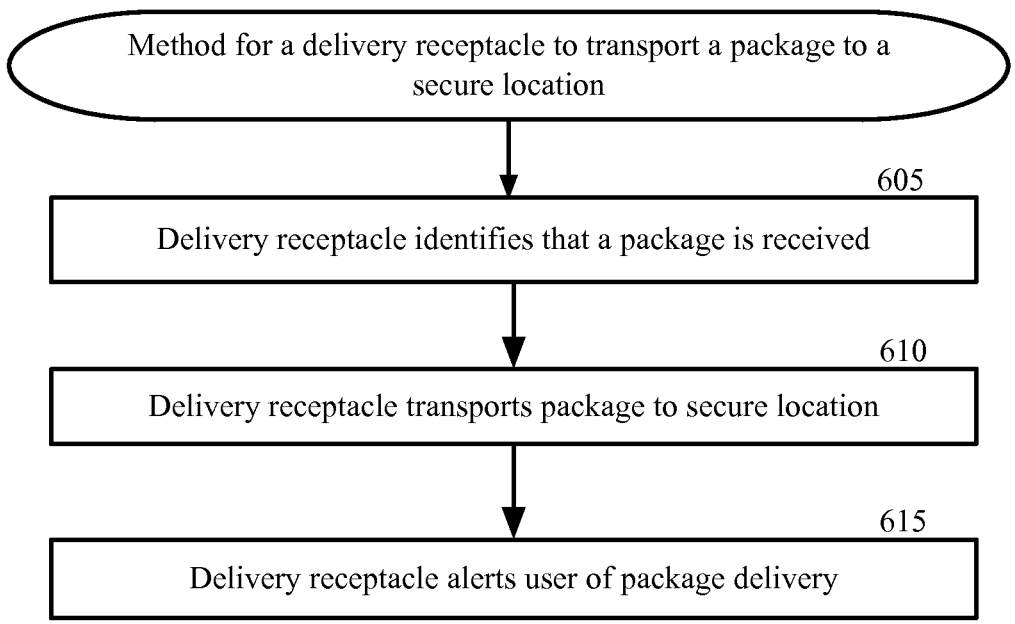
FIG. 6 is a block flow diagram depicting a method for a delivery receptacle to transport a package to a secure location, in accordance with certain example embodiments.

FIG. 6 is a block flow diagram depicting a method 245 for a delivery receptacle 130 to transport a package to a secure location, in accordance with certain example embodiments. The method 245 is described with reference to the components illustrated in FIG. 1.

In block 605, the delivery receptacle 130 identifies that a package is received. The delivery receptacle 130 may utilize any hardware or software to confirm that a package has been delivered. For example, the delivery receptacle 130 may have a proximity detector that recognizes that a package has been dropped into the body of the delivery receptacle 130. The proximity detector may utilize any suitable detection technology, such as infrared, electromagnetic, photoelectric, or capacitive. In another example, the delivery receptacle 130 may use a pressure sensor to detect the presence of a package. In certain embodiments, the delivery receptacle 130 may rely on a communication from the aerial delivery device computing system 121 to determine that the package has been delivered.

In block 610, the delivery receptacle 130 transports the package to a secure location. After receiving the delivery, the delivery receptacle 130 moves to a secure position to deposit or store the package. The delivery receptacle computing system 131 determines, based on the size, importance, or durability of the package, an appropriate location to store the package. The delivery receptacle computing system 131 provides instructions or other suitable signals to a driving mechanism or other motive mechanism to move the delivery receptacle 130 to the secure location.

The delivery receptacle 130 may move to the storage location by any suitable manner. For example, the delivery receptacle 130 may identify a preferred storage location on a stored map of the property. The delivery receptacle 130 may have a layout of the property stored on the delivery receptacle computing system 131, or the delivery receptacle 130 may develop a layout by traversing some or all of the property. The preferred locations for storage may be stored on the layout.

The delivery receptacle 130 may move to the storage location by any of the described means of locomotion. For example, the delivery receptacle 130 may initiate a power source that powers the delivery receptacle 130 to drive to the preferred location. In the example, the delivery receptacle 130 may be powered by an electric motor that drives the wheels to propel the delivery receptacle 130. In another example, the delivery receptacle 130 uses articulated legs to walk to the preferred location.

In an example, the delivery receptacle 130 receives a package and transports the package to a secure location, such as a garage attached to a residence on the property. The delivery receptacle 130 may enter the garage via a door or other entrance. In another example, the delivery receptacle computing system 131 engages a locking mechanism on the door through which the package was deposited in the delivery receptacle 130. That is, the package is secured within the body of the delivery receptacle 130. In this example, the delivery receptacle 130 may transport the package to a docking station or other base for the delivery receptacle 130. In this example, the delivery receptacle 130 may be automatically locked in the base to secure the delivery receptacle 130 and, thus, the package. The base may comprise a locking mechanism that prevents the delivery receptacle 130 from being removed or opened without authorization.

In another example, the package may be deposited in a mail slot if the package is sufficiently small. The delivery receptacle 130 may transport the package to a facility on the property, such as a house, and deposit the package in a slot or other depository via any automated mechanical process or material handling equipment. Any suitable mechanism or method may be used to secure the package and/or the delivery receptacle 130.

In block 615, the delivery receptacle 130 alerts the user computing device 110 of the package delivery. The alert may be provided by a communication via the communication module 132. For example, the delivery receptacle computing system 131 may use a Wi-Fi signal or a cellular connection to provide an email or text to the user computing device 110 that the package has been received and is secured.

Other Example Embodiments

FIG. 8 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, a television with one or more processors embedded therein and/or coupled thereto, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the invention claimed herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to automate package deliveries, comprising:
    receiving from a package delivery system processor, by one or more computing devices associated with a delivery device, delivery information associated with a package, the delivery information comprising a delivery location and instructions for the delivery device to approach the delivery location from a particular direction, the instructions further being provided to a delivery receptacle to provide a basis for directing one or more first beacons at the delivery location prior to arrival of the delivery device;
    transporting, by the delivery device, the package to the delivery location;
    locating, by the delivery device, the one or more first beacons being transmitted by the delivery receptacle at the delivery location;
    triangulating, by the one or more computing devices associated with the delivery device, a position of the delivery vehicle relative to the one or more first beacons;
    navigating, by the one or more computing devices associated with the delivery device, the delivery device toward the delivery receptacle based on the triangulated position;
    transmitting, by the one or more computing devices associated with the delivery device, a second beacon to the delivery receptacle, the second beacon providing a basis for the delivery receptacle to adjust a direction of the one or more first beacons during navigation of the delivery device toward the delivery receptacle; and
    depositing, by the delivery device, the package into the delivery receptacle.

2. The method of claim 1, further comprising adjusting, by the one or more computing devices associated with the delivery receptacle, the direction of the one or more first beacons based on a determined position of the delivery device.

3. The method of claim 2, wherein the direction of the one or more first beacons is adjusted by a mechanical device.

4. The method of claim 1, wherein the one or more first beacons are infrared beacons.

5. The method of claim 1, wherein the one or more first beacons are located on a top surface of the delivery receptacle.

6. The method of claim 1, further comprising communicating, by the one or more computing devices associated with the delivery device, a notice that the package has been delivered to the delivery receptacle.

7. The method of claim 1, wherein the delivery information associated with the delivery address further comprises a GPS location of the delivery location.

8. The method of claim 1, wherein the delivery information associated with the delivery location further comprises an address associated with the delivery location.

9. The method of claim 1, wherein the delivery device is an unmanned aerial delivery device.

10. A system to deliver packages in specified locations, comprising:
    a storage device associated with a delivery device; and
    a processor communicatively coupled to the delivery device storage device, wherein the processor executes application code instructions that are stored in the storage device to cause the system to:
        receive, from a package delivery computing system, delivery information associated with a package, the delivery information comprising a delivery address location;
        transport the package to the delivery address;
        detect one or more first beacons being transmitted by a delivery receptacle at the delivery address;
        navigate toward the delivery receptacle based on the detected one or more first beacons;
        transmit a second beacon to the delivery receptacle, the second beacon providing a basis for the delivery receptacle to adjust a direction of the one or more first beacons during navigation of the delivery device toward the delivery receptacle; and deposit the package into the delivery receptacle, and
a delivery receptacle storage device; and
a processor communicatively coupled to the delivery receptacle storage device, wherein the processor executes application code instructions that are stored in the delivery receptacle storage device to cause the system to:
receive a communication that the delivery device is transporting the package to the delivery receptacle;
transmit the one or more first beacons in an expected direction of arrival of the delivery device;
receive the second beacon from the delivery device;
determine a relative position of the delivery device with respect to the delivery receptacle based on the second beacon;
adjust the transmission direction of the one or more first beacons based on the relative position of the delivery device with respect to the delivery receptacle wherein the direction of the one or more first beacons is adjusted by a mechanical device; and
receive the package from the delivery device.

11. The system of claim 10, wherein the one or more first beacons are infrared beacons.

12. The system of claim 10, wherein the one or more first beacons are located on a top surface of the delivery receptacle.

13. The system of claim 10, wherein the delivery device is an unmanned aerial delivery device.

14. A computer program product, comprising:
a non-transitory computer-readable medium having computer-readable program instructions embodied thereon that when executed by a computer cause the computer to receive packages, the computer readable instructions comprising:
computer-readable program instructions to receive a communication that a delivery device is transporting a package to a delivery receptacle;
computer-readable program instructions to transmit one or more first beacons in an expected direction of arrival of the delivery device;
computer-readable program instructions to receive a second beacon from the delivery device;
computer-readable program instructions to determine a relative position of the delivery device with respect to the delivery receptacle based on the received second beacon; and
computer-readable program instructions to adjust the transmission direction of the one or more first beacons based on the relative position of the delivery device with respect to the delivery receptacle, wherein the direction of the one or more first beacons is adjusted by a mechanical device.

15. The computer program product of claim 14, wherein the one or more first beacons are infrared beacons.

16. The computer program product of claim 14, wherein the one or more first beacons are located on a top surface of the delivery receptacle.

17. The computer program product of claim 14, wherein the delivery device is an unmanned aerial delivery device.

* * * * *